US011809805B2

(12) United States Patent
Salehian et al.

(10) Patent No.: US 11,809,805 B2
(45) Date of Patent: *Nov. 7, 2023

(54) USING MACHINE LEARNING TO PREDICT PERFORMANCE OF SECURE DOCUMENTS

(71) Applicant: DocuSign, Inc., San Francisco, CA (US)

(72) Inventors: Soroush Salehian, Kirkland, WA (US); William Pittman, Seattle, WA (US); John Barcellos, Seattle, WA (US); Santiago Szuchmacher, Seattle, WA (US); Chris Marshall, Shoreline, WA (US); Jeong Woo Chang, Mercer Island, WA (US); Dylan Ray Häs, Seattle, WA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,859

(22) Filed: Feb. 28, 2022

(65) Prior Publication Data

US 2022/0180042 A1 Jun. 9, 2022

Related U.S. Application Data

(63) Continuation of application No. 17/067,558, filed on Oct. 9, 2020, now Pat. No. 11,301,616.

(51) Int. Cl.
*G06F 40/00* (2020.01)
*G06F 40/106* (2020.01)
(Continued)

(52) U.S. Cl.
CPC ........ *G06F 40/106* (2020.01); *G06F 18/2193* (2023.01); *G06F 21/6209* (2013.01);
(Continued)

(58) Field of Classification Search
CPC ..... G06F 40/106; G06F 40/186; G06F 40/216
See application file for complete search history.

(56) References Cited

U.S. PATENT DOCUMENTS 7,890,442 B2 * 2/2011 Weir ................... G06N 7/01
706/45
8,326,859 B2 * 12/2012 Paek .................. G06Q 10/10
707/767

(Continued)

OTHER PUBLICATIONS

Balkhi, S. "10 Form Conversion Best Practices," WPForms Blog, Aug. 19, 2020, 18 pages, [Online] [Retrieved Aug. 7, 2021], Retrieved from the Internet <URL:https://web.archive.org/web/20201004093358/https://wpforms.com/research-based-tips-to-improve-contact-form-conversions/>.

(Continued)

*Primary Examiner* — Scott T Baderman
*Assistant Examiner* — Barbara M Level
(74) *Attorney, Agent, or Firm* — KDW FIRM PLLC

(57) ABSTRACT

A system and a method are disclosed for detecting that a requesting user is transmitting a request to a recipient user to perform one or more tasks with respect to a secure document. The system extracts features associated with the secure document and inputs the features into a machine learning model that outputs one or more probabilities corresponding to a potential failure of the request. Based on the one or more probabilities, the system generates one or more feature modification activities to improve a likelihood of the recipient user completing the request. The system provides the one or more feature modification activities to at least one of the requesting user and the recipient user.

20 Claims, 5 Drawing Sheets

(51) Int. Cl.
  *G06V 30/40* (2022.01)
  *G06N 20/00* (2019.01)
  *G06F 21/62* (2013.01)
  *G06F 40/186* (2020.01)
  *G06F 40/216* (2020.01)
  *G06F 18/21* (2023.01)

(52) U.S. Cl.
  CPC .......... *G06F 40/186* (2020.01); *G06F 40/216* (2020.01); *G06N 20/00* (2019.01); *G06V 30/40* (2022.01)

(56) References Cited

U.S. PATENT DOCUMENTS

| | | | | |
|---|---|---|---|---|
| 9,405,427 | B2* | 8/2016 | Curtis | G06N 20/00 |
| 11,188,840 | B1* | 11/2021 | Rivera | H04L 67/145 |
| 11,301,616 | B1* | 4/2022 | Salehian | G06F 21/6209 |
| 2012/0110579 | A1* | 5/2012 | Bullen | G06Q 10/10 |
| | | | | 718/100 |
| 2014/0229407 | A1* | 8/2014 | White | G06N 20/00 |
| | | | | 706/46 |
| 2015/0121378 | A1* | 4/2015 | Whyte | G06F 9/448 |
| | | | | 718/100 |
| 2016/0055010 | A1 | 2/2016 | Baird et al. | |
| 2016/0080426 | A1 | 3/2016 | Fleischman et al. | |
| 2016/0110280 | A1* | 4/2016 | Singh | G06F 3/04842 |
| | | | | 715/762 |
| 2016/0117670 | A1 | 4/2016 | Davis | |
| 2016/0170950 | A1* | 6/2016 | Malden | G06Q 20/3821 |
| | | | | 715/233 |
| 2016/0314110 | A1 | 10/2016 | Corcoran | |
| 2017/0083867 | A1 | 3/2017 | Saxena et al. | |
| 2017/0169438 | A1* | 6/2017 | Maynard | G06Q 30/016 |
| 2017/0289093 | A1 | 10/2017 | Snider et al. | |
| 2018/0107665 | A1* | 4/2018 | Yang | G06Q 50/01 |
| 2020/0202378 | A1 | 6/2020 | Sairam et al. | |
| 2021/0133287 | A1* | 5/2021 | Ayloo | G06F 40/274 |

OTHER PUBLICATIONS

Taylor, M., "58 Form Design Best Practices & Form UX Examples," Venture Harbour, Sep. 22, 2020, 35 pages, [Online] [Retrieved Aug. 7, 2021], Retrieved from the Internet <URL:https://web.archive.org/web/20200929015445/https://www.ventureharbour.com/form-desigh-best-pracites/>.

* cited by examiner

500

```
┌─────────────────────────────────────────────────────────────┐
│ Determine that a requesting user is transmitting a request  │
│ to a recipient user to perform one or more tasks with       │
│ respect to a secure document                                │
│                         510                                  │
└─────────────────────────────────────────────────────────────┘
                              │
                              ▼
┌─────────────────────────────────────────────────────────────┐
│ Extract a plurality of features associated with the secure  │
│ document                                                     │
│                         520                                  │
└─────────────────────────────────────────────────────────────┘
                              │
                              ▼
┌─────────────────────────────────────────────────────────────┐
│ Input the extracted features into a machine learning model  │
│                         530                                  │
└─────────────────────────────────────────────────────────────┘
                              │
                              ▼
┌─────────────────────────────────────────────────────────────┐
│ Receive, as an output from the machine learning model, one  │
│ or more probabilities corresponding to a potential failure  │
│ of the request.                                              │
│                         540                                  │
└─────────────────────────────────────────────────────────────┘
                              │
                              ▼
┌─────────────────────────────────────────────────────────────┐
│ Generate one or more feature modification activities based  │
│ on the one or more probabilities                             │
│                         550                                  │
└─────────────────────────────────────────────────────────────┘
                              │
                              ▼
┌─────────────────────────────────────────────────────────────┐
│ Provide the one or more feature modification activities to  │
│ at least one of the requesting user and the recipient user  │
│                         560                                  │
└─────────────────────────────────────────────────────────────┘
```

FIG. 5

USING MACHINE LEARNING TO PREDICT PERFORMANCE OF SECURE DOCUMENTS

CROSS REFERENCE TO RELATED APPLICATIONS

This application is a continuation of U.S. application Ser. No. 17/067,558, filed Oct. 9, 2020, now U.S. Pat. No. 11,301,616, which is incorporated by reference in its entirety.

TECHNICAL FIELD

The disclosure generally relates to the field of secure digital documents, and more particularly relates to applying machine learning to detect attributes of secure digital documents that may lead to failures in secure documents.

BACKGROUND

Secure digital documents (also referred to herein as "secure documents") are documents electronically provided to recipient users in requests generated by requesting users. A requesting user may send a request for a recipient user to perform tasks such as adding textual information to pre-designated input fields (e.g., biographical information such as a user's name, address, etc.), providing a signature, and providing attachments. After sending the request, the requesting user may track whether the recipient user has successfully completed the request. However, when the recipient user does not complete the request at all or completes the request late, the requesting user may not know the factors causing the recipient user to fail at or delay completing the request. Incomplete requests or delays can result in inefficient workflow, but it is difficult for the requesting user to determine a strategy for modifying the request to improve the likelihood of the recipient user completing the request.

SUMMARY

Systems and methods are disclosed herein for determining feature modification activities to improve the likelihood of request completion by the recipient user. In an embodiment, a secure document service detects that a requesting user is transmitting a request to a recipient user to perform one or more tasks with respect to a secure document. After detecting the transmission, the secure document service extracts a plurality of features associated with the secure document. The features may include attributes associated with the secure document, the tasks to be performed, and/or user characteristics associated with the requester user or the recipient user. The secure document service inputs the extracted features to a machine learning model that is trained based on features of historical secure documents and completion data associated with the historical secure documents. Based on the extracted features, the machine learning model outputs probabilities corresponding to a potential failures of the request. That is, the machine learning model determines features that may deter the recipient user from completing the request. For example, the machine learning model may determine a probability of the recipient user failing to complete the request because of a difficult or time consuming task, a probability of the recipient user failing to complete the request because the request was transmitted outside of convenient hours (e.g., on a Friday afternoon), or a probability of the recipient user failing to complete the request because of a number of tasks to complete.

The secure document service generates feature modification activities based on the output probabilities from the machine learning model, where the feature modification activities are configured to improve a likelihood of the recipient user completing the request. For example, if there is a high probability of a recipient user failing to complete the request because of a task of providing an attachment, the secure document service may determine that removing the task from the request would improve the likelihood of the recipient user competing the request. The feature modification activities are provided to at least one of the requesting user and the recipient user. For example, the secure document service may send a recommendation to the requesting user to remove the task from the request or may automatically increase a frequency of reminders to send to the recipient user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 illustrates a process of identifying feature modification activities associated with secure documents, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment for Secure Document Service

Figure 1:
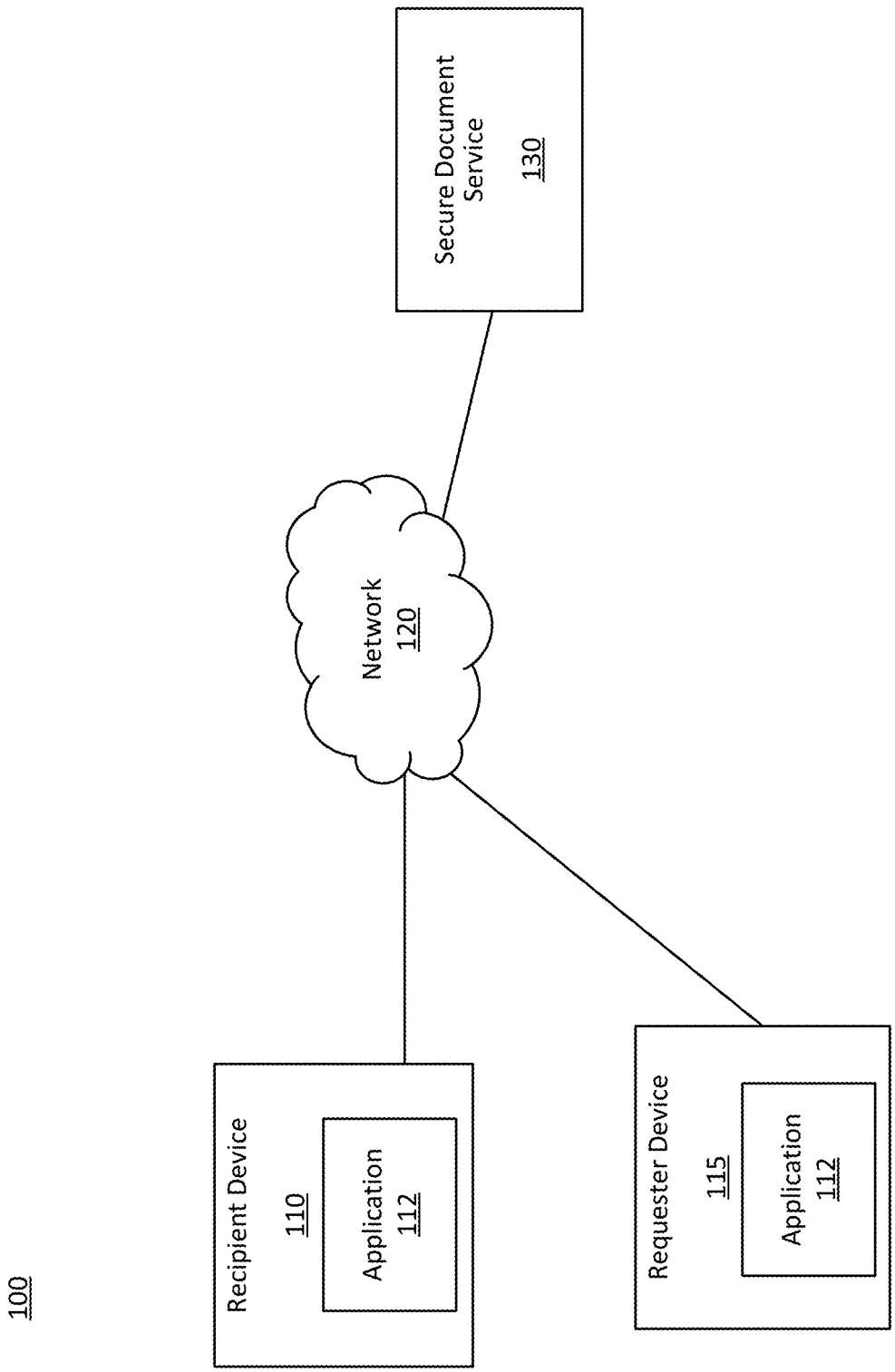
FIG. 1 illustrates a system environment of a secure document service configured to identify feature modification activities associated with secure documents, in accordance with one embodiment.

Figure (FIG. 1 illustrates a system environment of a secure document service configured to identify feature modification activities associated with secure documents, in accordance with one embodiment. Environment 100 includes a recipient device 110, a requester device 115, and a secure document service 130 through a network 120. The elements of environment 100 are exemplary only, and fewer, more, or different elements may be implemented without departing from the scope of the disclosure.

The environment 100 includes various client devices, such as recipient device 110 and requester device 115. The term client device, as used herein, may refer to a computing device such as smartphones with an operating system such as ANDROID® or APPLE® IOS®, tablet computers, laptop computers, desktop computers, electronic stereos in automobiles or other vehicles, or any other type of network-enabled device from which secure documents may be accessed or otherwise interacted with. Typical client devices include the hardware and software needed to input and output sound (e.g., speakers and microphone) and images, connect to the network 120 (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The recipient device 110 is a device operated by a recipient user of a secure document to access and perform tasks with respect to a secure document of a request. A secure document (also referred to as "document") is an electronic document with security encoded to ensure integrity of the document. An example of a secure document is a document for signature by a recipient user, where the document cannot be modified by the recipient user other than to sign the document. Another example of a secure document is a form with editable input fields, where the content of the form cannot be modified other than to enter information into the input fields. Secure documents need not be single documents, and instead may be a collection of content items including documents and other forms of information (e.g., an "envelope" including documents, spreadsheets, pictures, and so on), though the term "secure document" is used in non-limiting fashion in singular form throughout this disclosure for convenience.

The term "recipient user" may refer to a person designated to complete a request by performing one or more tasks with respect to a secure document via the recipient device 110. The recipient user may receive a request associated with a secure document via the recipient device 110. The request may include one or more tasks designated by the requester for the recipient to perform to complete the request. The one or more tasks may include reviewing a secure document, adding a digital signature to the secure document, filling input fields, providing attachments, answering questions, modifying content of the secure document, forwarding the secure document to another user, and so on. While only one recipient device 110 is illustrated in FIG. 1, any number of recipients may be designated to complete requests associated with secure documents, and those recipients may share a recipient device 110 or may each operate their own recipient device 110. Also, a recipient user may access a request on multiple recipient devices 110.

The recipient device 110 may have application 112 installed thereon. The application 112 may be a stand-alone application downloaded by a client device from the secure document service 130. Alternatively, the application 112 may be accessed by way of a browser installed on the client device, accessing an application instantiated from secure document service 130 using the browser. In the case of a stand-alone application, browser functionality may be used by the application 112 to access certain features of secure document service 130 that are not downloaded to the client device. The application 112 may be used by the recipient device 110 to use functions of the secure document service 130 for receiving a request from the requester device 115, accessing a secure document associated with the request, and performing one or more of the tasks in the request.

The requester device 115 is operated by a requester user that initiates a request associated with a secure document. The requester user may be an administrator of the secure document, which may be a person who created the secure document and/or who has authority to administer the document by changing content of the secure document, granting or denying rights to access the secure document, places restrictions on, selects tasks to be performed with respect to the secure document, or sends the secure document to one or more recipients. More than one requester user may manage the secure document using a same requester device 115 or using their own requester devices 115. The requester device 115 may have the application 112 installed thereon to manage the secure document and share the secure document with the recipient device 110.

The recipient device 110 and the requester device 115 access the secure document service 130 through the network 120. Network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

The secure document service 130 provides the application 112 to client devices (e.g., recipient device 110, requester device 115), and additionally performs functionality connected to secure documents, including creation, verification, rights management, storage, circulation, and so on. While secure document service 130 is depicted as a single entity, secure document service 130 may be implemented through functionality spread across and/or replicated across a plurality of servers. Moreover, some or all of the functionality of secure document service 130 may be integrated into application 112 for on-board processing at a client device. Further details of secure document service 130 are discussed below with respect to FIG. 2.

Secure Document Service Implementation

Figure 2:
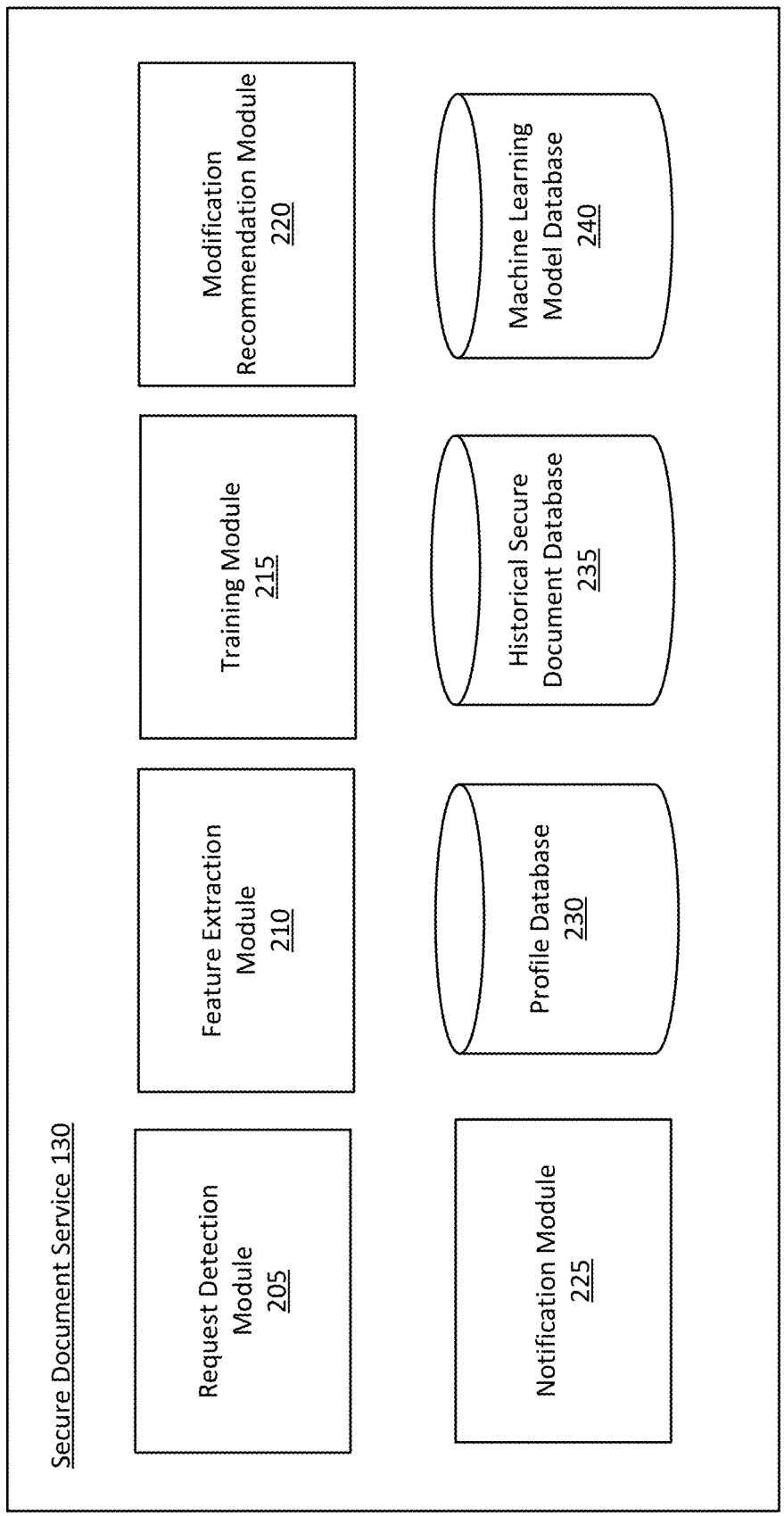
FIG. 2 illustrates exemplary modules and databases used by a secure document service, in accordance with one embodiment.

FIG. 2 illustrates exemplary modules and databases used by a secure document service, in accordance with one embodiment. The secure document service 130 analyzes features associated with requests made by requester users to provide insights on how to improve the likelihood of recipient users completing the requests. The secure document service 130 uses machine learning models that are trained based on features and performance of historical secure documents that were sent out in previous requests managed by the secure document service 130. The historical secure documents may include secure documents associated with requests made by other requester users of the secure document service. Among other benefits, the secure document service 130 can determine customized feature modification activities to improve conversion rate of a request using features and completion data associated with historical secure documents that an individual requester user typically does not have access to.

The secure document service 130 includes a request detection module 205, a feature extraction module 210, a training module 215, a modification recommendation module 220, a notification module 225, a profile database 230, a historical secure document database 235, and a machine learning model database 240. The modules and databases illustrated in FIG. 2 are merely exemplary; fewer or more modules or databases may be used to achieve the functionality described herein. Moreover, while described below as implemented within secure document service 130, some or all of the modules and/or databases described herein may be implemented on a client device (e.g., as modules running within application 112, as databases stored in memory on a client device, etc.).

The request detection module 205 may detect an attempt to transmit a request from a requester device 115 to a recipient device 110. The request may include instructions for a recipient user associated with the recipient device 110 to perform tasks with respect to a secure document. For example, a requester user associated with the requester device 115 may select one or more recipient users to receive the request and press a "send" button in a graphical user interface of the application 112. Responsive to detecting that the requester user has pressed the "send" button, the request detection module 205 may determine that the requester device 115 is attempting to send the request.

The tasks in the request may include any requested interaction with the secure document, such as opening the secure document, reviewing contents of the secure document, editing the contents of the secure document, signing the secure document, forwarding the secure document to another user, performing identity verification, providing attachments, and completing input fields of the secure document. The tasks may be specified by the requester user by configuring fields to be completed by the recipient. The requesting user may add signature blocks, input fields for textual input, and input field for receiving attachments (e.g., images, spreadsheets, documents). In some embodiments, one or more tasks may be added to the request by the secure document service 130 responsive to detecting the request initiated by the requester device 115 such as adding an additional identification protocol, downloading the application 112 to access the secure document, and creating an account associated with the secure document service 130.

The feature extraction module 210 extracts features associated with a request from a requester device 115. After the request detection module 205 detects a request, the feature extraction module 210 determines features or attributes associated with a secure document in the request. The features may include one or more of document type of the secure document, content of secure document (e.g., certain keywords within certain portions of the document or within the document as a whole, weights applied depending on keyword location, etc., and/or a keyword-agnostic look at the content of the document), metadata associated with the secure document (e.g., creator, access privileges, date of creation, place of creation, template associated with the secure document, and any other aspect of the document. The features may be associated with the one or more tasks for completing the request such as total number of input fields, types of input fields, whether attachment is requested, combination of fields, layout of input fields on the secure document, and so on. The features may also include time and date of transmission of the request.

In some embodiments, the features may be associated with the requesting user and/or the recipient user. For example, the features may include user characteristics stored in the profile database 230, previous activity within the secure document service 130, known devices associated with the user, average time of user to complete a request, and other information associated with the user. The profile database 230 includes profile data of users (e.g., recipients, requesters, and any other participants) of the secure document service 130. The profile data may include data input by the users (e.g., demographic and biographical information). The profile data may include data associated with users that was not input by the users (e.g., successful request completion rate, average time to complete requests, frequency of activity within the secure document service 130, type of subscription with secure document service 130, devices used by the user to access the secure document service 130, trust score as computed by aggregating attributes of other profile data, and so on). The profile data may include activity history of the users such as previous request sent or received, and types of interactions made by the users.

The training module 215 trains one or more machine learning models stored in machine learning model database 235 to output probabilities corresponding to a potential failure of a request based on input of extracted features associated with the request. The machine learning models may be supervised or unsupervised models. For supervised learning, training data may include features and completion data of historical secure documents from the historical secure document database 235. Based on performance of historical secure documents, the machine learning models may learn patterns in recipient user behavior to output a probability of recipient users failing to complete a request within a time frame or at all (e.g., 30% probability that recipient A fails to complete the request within a day/week/ month, 6% probability that recipient A fails to open the request) based on input of features from the feature extraction module 210. In an embodiment, the probabilities may be weighted based on the specific profile data of the specific recipient user of the document. The machine learning may also output probabilities of the recipient user failing to complete the request (or a task) based on specific features associated with the request. For example, the machine learning models may output a probability of a recipient user failing to complete a request because it includes a type of task (e.g., time consuming task such as providing an attachment, inputting sensitive information), a probability of a recipient user failing to complete a request because the request was transmitted outside of convenient hours (e.g., Friday after 12 pm, past 8 pm on a weekday, on a weekend or holiday), a probability of a recipient user failing to complete a request because of a combination of input fields (e.g., repetitive input fields), a probability of a recipient user failing to complete a request because of a length of a secure document or a number of input fields to complete, a probability of a recipient user failing to complete a request because of an order of input fields on a page, and so on.

The historical secure document database 235 stores secure documents that have been sent to recipient users in previous requests. A subset of the historical secure documents in the historical secure document database 235 may be selected to be used as training data for the machine learning models in the machine learning model database 240. For each of the historical secure documents, the historical secure document database 235 may store information such as features and completion data associated with the historical secure document (e.g., where the features are taken in a pair with the completion data used as labels to form each sample of training data). As described in detail above with respect to the feature extraction module 210, features of a historical secure document may include attributes of the document, characteristics of users associated with the document, and tasks associated with the document. Completion data of the historical security document may describe how recipient users have previously interacted with the historical security document responsive to receiving the historical security document in a request. Completion data may include how much time the recipient users took to access the document after receiving it, date and time at which the request was sent, type of device used to access the document (e.g., mobile phone vs. laptop), type of browser used to access the document, how long the recipient users took to complete the request, last completed input field, time spent to complete each of the input fields, order in which the recipient users completed the input fields, number of sessions to complete the request, time at which the request including the secure document was transmitted, and so on.

The machine learning model database 240 stores one or more machine learning models trained using the training module 215. The one or more machine learning models may be implemented using a variety of types of machine-learned models or trainable networks. For example, the one or more machine learning models may be a neural network, decision tree, or other type of computer model, and any combination thereof. In some embodiments, one or more machine learning models may be configured to determine a different probability. For example, a first machine learning model may be configured to determine a probability of a recipient user failing to complete a request because the request includes a time consuming task (e.g., providing an attachment), and a second machine learning model may be configured to determine a probability of a recipient user failing to complete a request because of a time that the request was transmitted (e.g., on a Friday afternoon). In some embodiments, multiple machine learning models may operate in parallel to identify other variations of probabilities. In an embodiment, a single machine learning model (e.g., a multi-task machine learning model) may be trained to output multiple probabilities, each corresponding to different failure types.

The modification recommendation module 220 determines feature modification activities to improve a likelihood of a recipient user completing a request. The term feature modification activities, as used herein, may refer to making changes to one or more features associated with a request to make it easier for a recipient user to perform one or more tasks within a desired time frame (e.g., recommending to the requester user to remove or modify a task, send reminders, delay transmitting request until Monday morning). The modification recommendation module 220 may receive, from machine learning models, one or more probabilities corresponding to potential failure of a recipient user to complete a request. Based on the one or more probabilities, the modification recommendation module 220 generates one or more feature modification activities to improve a likelihood of the recipient user completing the request. Each probability output from the training module 215 may be associated with one or more features of a request, where each feature is associated with one or more feature modification activities. For example, if the probability indicates a likelihood of a recipient user failing to complete a request because it includes a type of task, the modification recommendation module 220 may identify which feature modification activities are associated with the type of task. The identified feature modification activities may include removing the task, including additional instructions on how to perform the task, moving the task to a different part of the secure document, and so on. In some embodiments, the modification recommendation module 220 may use one or more machine learning models to identify the feature modification activities are associated with the probabilities.

After identifying the feature modification activities associated with a probability, the modification recommendation module 220 may select which feature modification activities to be performed. Each of the identified feature modification activities may be associated with a threshold value for the probability to be compared against to evaluate whether the feature modification activity would be useful in improving the likelihood of the user completing the request. The modification recommendation module 220 may compare the probability to the threshold value of the feature modification activity and select the feature modification to be provided to a requesting user or a recipient user if the probability exceeds the threshold value. The threshold value may vary for different feature modification activities.

The modification recommendation module 220 may determine an updated likelihood of a recipient user completing the request if a feature modification activity were to be performed. The modification recommendation module 220 may make a final decision on whether to perform the feature modification activity based on the updated likelihood. For example, if a feature modification activity is predicted to improve a probability of a recipient user completing the request by a percentage below a threshold (e.g., 10%), the modification recommendation module 220 may determine not to perform the feature modification activity since it is not worth the time and computing resources.

In some embodiments, the modification recommendation module 220 identifies one or more feature modification activities based on tasks associated with a probability. For example, a probability may indicate a likelihood of a recipient user failing to complete the request because of a type of task required to complete the request. For example, a task of capturing an image and uploading the image, adding an attachment, answering a long question may cause a recipient user to quit working on the request because it is a time consuming to complete. The modification recommendation module 220 may identify feature modification activities such as removing the task from the request, simplifying the task by changing an input field from a text box to a multiple choice checkbox, placing the task at the beginning of the secure document instead of the end, and so on. The modification recommendation module 220 may also identify one or more feature modification activities based on a number of tasks in a request. When a request includes more than a threshold number of tasks, a probability of a recipient user failing to complete the request may be higher when the recipient user is on a mobile phone than when the recipient user is on a computer. The modification recommendation module 220 may recommend adding a message to the recipient user to use a computer for easier user experience.

In some embodiments, the modification recommendation module 220 identifies one or more feature modification activities based on user characteristics of a recipient user. Based on settings indicated in a user profile associated with the recipient user, previous activity, and other user characteristics, the modification recommendation module 220 may select the one or more feature modification activities. For example, if a first recipient user is an active user who logs onto access the secure document service 130 frequently and has a history of completing requests within a specified time frame, the modification recommendation module 220 may lower a frequency of reminders sent to the first recipient user. On the other hand, if a second recipient user is an inactive user who is late at completing requests, the modification recommendation module 220 may increase a frequency of reminders sent to the second recipient user.

In some embodiments, the modification recommendation module 220 identifies one or more feature modification activities based on day and time of request transmission. If a requester attempts to send a request on a day or at a time during which a user is unlikely to interact with the request (e.g., after 12 pm on a Friday), the modification recommendation module 220 may recommend that the requester user delay sending the request to a later time (e.g., next Monday morning).

In some embodiments, the modification recommendation module 200 identifies one or more feature modification activities based on a version of secure document sent in a request. The secure document service 130 may automatically detect a version or templates that the secure document is associated with and determine if it is a version with a high completion rate. If the detected version is less likely to result in conversion compared to other versions of the secure document managed by the secure document system, the training module 215 may recommend using another version with a higher completion rate.

In some embodiments, after identifying feature modification activities to be performed, the modification recommendation module 220 may cause the secure document service 130 to perform one or more of the feature modification activities automatically. The secure document service 130 may perform certain feature modification activities such as adjusting settings for reminders without getting explicit instructions from the requester user. To prevent making unwanted modifications, the secure document service 130 may ask a requester user for permission to perform feature modification activities for all document requests sent by the requester user. (e.g., indicate in account settings to allow the secure document service 130 to adjust reminder schedules as appropriate). In other embodiments, feature modification activities may not be performed without approval from the requester user.

Figure 3:
FIG. 3 illustrates a graphical user interface (GUI) presenting recommendations of feature modification activities associated with a secure document, in accordance with one embodiment.

The notification module 225 may present the one or more feature modification activities to a requester. The notification module 225 may receive one or more feature modification activities and generate notifications associated with the feature modification activities to be presented in a graphical user interface of an application or website associated with the secure document service 130. A notification may include a predicted likelihood of a recipient user completing a request, one or more recommended feature modification activities, instructions for performing the recommended feature modification activities, predicted improvement in the likelihood of the recipient user completing a request responsive to the recommended feature modification activities (e.g., 15% improvement responsive to feature modification activity A), and any other relevant information. An example of notifications presented to a requester user is illustrated in FIG. 3. In some embodiments, the notifications may include graphical elements that allows the requester user to provide instructions on whether to perform a corresponding feature modification activity. When the requester user provides instructions using the graphical elements, the secure document system may perform the feature modification activity on behalf of the requester user or direct the requester user to a page to allow the requester user to perform the feature modification activity (e.g., open editing interface for the requester user to edit content of a secure document, go to settings page).

Graphical User Interface of Secure Document Service

FIG. 3 illustrates a graphical user interface (GUI) presenting recommendations of feature modification activities associated with a secure document, in accordance with one embodiment. User interface 300 includes a secure document 310 related to motor vehicle insurance claim as presented to a requester user (e.g., insurance company employee) that is sending a request to a recipient user (e.g., policy holder) to perform tasks with respect to the secure document 310 to make an insurance claim. The secure document 300 may include a plurality of tasks to be performed by a recipient user such as providing biographical information (e.g., in input fields 1 through 9), providing details on accident (e.g., input fields 10 through 14), and adding attachments.

When the requester user sends the request to the recipient user, the secure document service 130 detects the request and identifies feature modification activities that may improve a likelihood of the recipient user to complete the secure document 310 within a specified timeframe (e.g., a week). The secure document service 130 may extract features associated with the request and identify the feature modification activities based on the features.

In an example, the secure document service 130 may determine that a probability of the recipient user not opening the secure document within the specified timeframe is greater than a threshold value. The secure document service 130 may generate a first notification 315 that notifies the requester user that the reminder frequency setting for the recipient user has been increased. The first notification 315 may include a stop button 317A that the recipient user can interact with (e.g., by clicking on the button) to revert the reminder frequency setting.

In an example, the secure document service 130 may generate a second notification 320 that describes a probability of users failing to complete the request because of a day and time at which the request is transmitted. The second notification 320 may include a probability of a user failing to perform he request given and a recommended feature modification activity of delaying the transmission until Monday. The second notification 320 may include a yes button 320A and a no button 322B associated with the feature modification activity. If the requester user interacts with the yes button 322A, the secure document service 130 may automatically delay transmitting the request to LOAM on upcoming Monday, schedule a reminder at LOAM on upcoming Monday to remind the recipient user about the request, or direct the user to an appropriate page to make the feature modification. If the requester user interacts with the no button 322B, the secure document service 130 may remove the second notification 320 from display in the interface 300.

In an example, the secure document service 130 may generate a third notification 325 that describes a probability of users leaving the secure document 310 before completing a particular input field. The third notification 325 may include a recommended feature modification activity of removing the field to and an updated likelihood of users completing a request if the input field is removed from the request. The third notification 325 may include a yes button 327A and a no button 327B. If the requester user selects the yes button 327A in response to the recommendation to remove input field 13, the secure document service 130 may display a portion of the secure document that includes the input field recommended to be removed or may remove the input field on behalf of the requester user. If the requester user interacts with the no button 327B, the secure document service 130 may remove the third notification 325 from display in the interface 300.

Computing Machine Architecture

Figure 4:
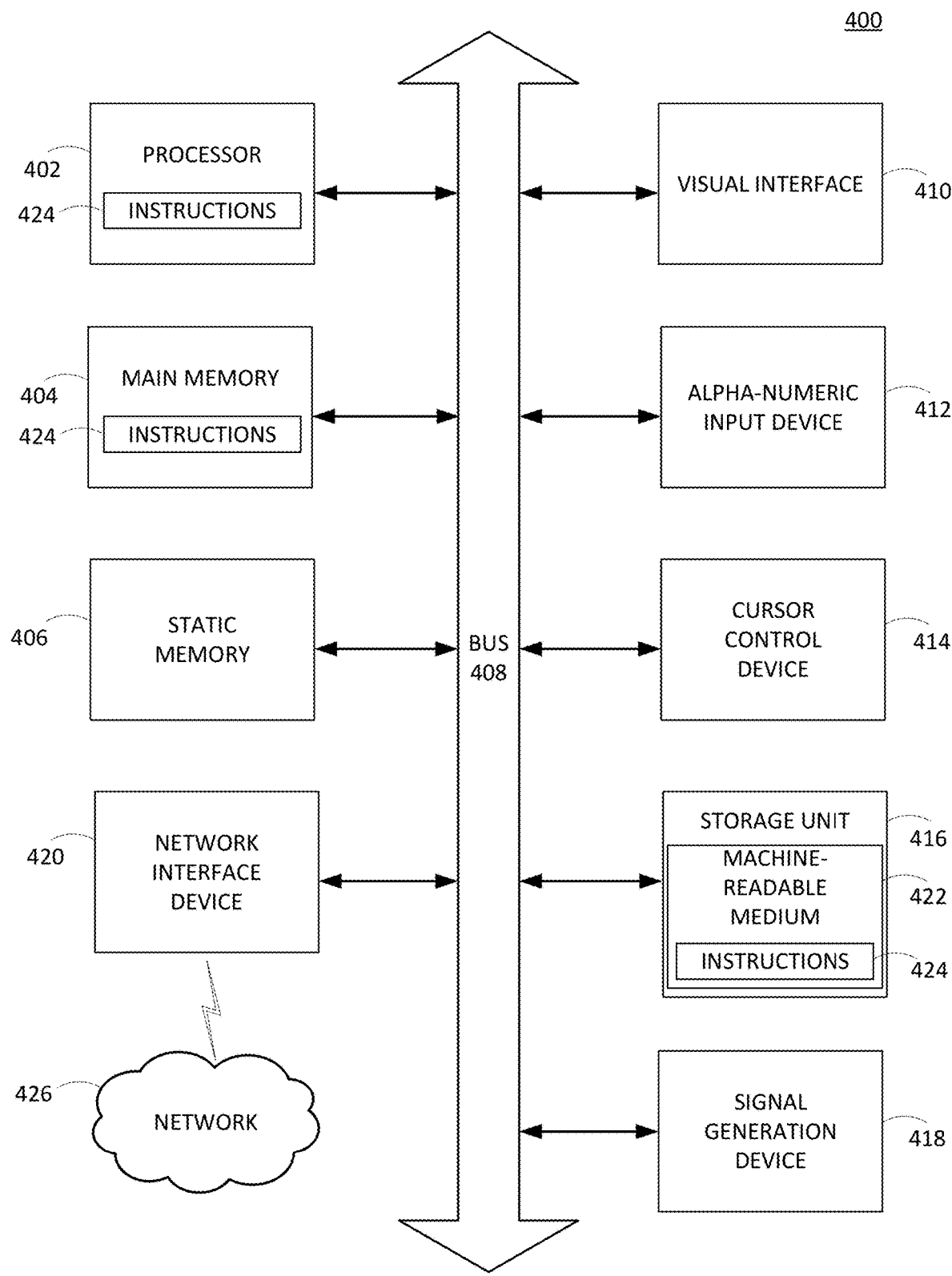
FIG. 4 illustrates components of an example machine able to read instructions from a machine-readable medium and execute them in a processor (or controller), in accordance with one embodiment.

FIG. 4 illustrates components of an example machine able to read instructions from a machine-readable medium and execute them in a processor (or controller), in accordance with one embodiment. Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein. Any client device or service disclosed herein may use some or all functionality described with respect to the machine.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Illustrative Data Flow for Identifying Feature Modification Activities

FIG. 5 illustrates a process of identifying feature modification activities associated with secure documents, in accordance with one embodiment. In process 500, secure document system 130 determines 510 that a requesting user is transmitting a request to a recipient user to perform one or more tasks with respect to a secure document (e.g., using request detection module 205). The secure document service 130 extracts 520 a plurality of features associated with the secure document (e.g., using feature extraction module 210). The plurality of features may include document type, content of document, metadata, tasks to be completed with respect to the document, and other attributes of the secure document.

After extracting the features, the secure document service 130 inputs 530 the extracted features into a machine learning model trained to output one or more probabilities corresponding to a potential failure of the request by the recipient user (e.g., using training module 215). The secure document service 130 receives 540 one or more probabilities corresponding to a potential failure of the request as an output from the machine learning model. Based on the one or more probabilities, the secure document service 130 generates 550 one or more feature modification activities configured to improve a likelihood of the recipient completing the request (e.g., using modification recommendation module 220). The secure document service 130 provides 560 the one or more future modification activities to at least one of the requesting user and the recipient user.

ADDITIONAL CONFIGURATION CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
    detecting that a requesting user is transmitting a request to a recipient user to perform one or more tasks with respect to a secure document;
    in response to detecting that the requesting user is transmitting the request, determining a probability that the recipient user fails to complete the transmitted request by applying a machine learned model trained on features and completion data associated with historical secure documents to features of the secure document;
    in response to determining the probability, identifying a plurality of action recommendations associated with the determined probability, determining a value of probability associated with each action recommendation in the plurality of action recommendations, and selecting, based on a comparison of the value of probability associated with each action recommendation to a threshold value, one or more action recommendations in the plurality of action recommendations configured to, when performed, improve a likelihood of the recipient user completing the request; and
    presenting the selected one or more action recommendations to the requesting user, and displaying the value of probability associated with each of the selected one or more action recommendations exceeding the threshold value.

2. The method of claim 1, wherein the one or more selected action recommendations comprise a threshold number of action recommendations most likely to improve the likelihood of the recipient user completing the request.

3. The method of claim 2, wherein the one or more selected action recommendations comprise presenting a recommendation to the requesting user to modify a feature associated with the secure document, the recommendation including an updated likelihood of the recipient user completing the request responsive to modifying the feature.

4. The method of claim 1, wherein the one or more tasks comprises one or more of: signing the secure document, uploading an attachment, adding information into an input field, and approving the secure document.

5. The method of claim 1, wherein the selected one or more action recommendations comprises removing a task for the recipient user from the request.

6. The method of claim 1, wherein the selected one or more action recommendations comprises changing a frequency of reminders sent to the recipient user to complete the request.

7. The method of claim 1, wherein the selected one or more action recommendations comprises changing a layout of input fields in the secure document.

8. The method of claim 1, wherein the selected one or more action recommendations comprises delaying a transmission of the request.

9. The method of claim 1, wherein the one or more action recommendations are selected based on user characteristics of the recipient user.

10. The method of claim 1, wherein the one or more action recommendations are selected based on a value of the threshold.

11. A non-transitory computer-readable storage medium storing executable instructions that, when executed by a hardware processor, cause the hardware processor to perform operations comprising:
    detecting that a requesting user is transmitting a request to a recipient user to perform one or more tasks with respect to a secure document;
    in response to detecting that the requesting user is transmitting the request, determining a probability that the recipient user fails to complete the transmitted request by applying a machine learned model trained on features and completion data associated with historical secure documents to features of the secure document;
    in response to determining the probability exceeding a threshold, identifying a plurality of action recommendations associated with the determined probability, determining a value of probability associated with each action recommendation in the plurality of action recommendations, and selecting, based on a comparison of the value of probability associated with each action recommendation to a threshold value, one or more action recommendations in the plurality of action recommendations configured to, when performed, improve a likelihood of the recipient user completing the request; and
    presenting the selected one or more action recommendations to the requesting user, and displaying the value of probability associated with each of the selected one or more action recommendations exceeding the threshold value.

12. The non-transitory computer-readable storage medium of claim 11, wherein the one or more selected action recommendations comprise a threshold number of action recommendations most likely to improve the likelihood of the recipient user completing the request.

13. The non-transitory computer-readable storage medium of claim 12, wherein the one or more selected action recommendations comprise presenting a recommendation to the requesting user to modify a feature associated with the secure document, the recommendation including an updated likelihood of the recipient user completing the request responsive to modifying the feature.

14. The non-transitory computer-readable storage medium of claim 11, wherein the one or more tasks comprises one or more of: signing the secure document, uploading an attachment, adding information into an input field, and approving the secure document.

15. The non-transitory computer-readable storage medium of claim 11, wherein the selected one or more action recommendations comprises removing a task for the recipient user from the request.

16. The non-transitory computer-readable storage medium of claim 11, wherein the selected one or more action recommendations comprises changing a frequency of reminders sent to the recipient user to complete the request.

17. The non-transitory computer-readable storage medium of claim 11, wherein the selected one or more action recommendations comprises changing a layout of input fields in the secure document.

18. The non-transitory computer-readable storage medium of claim 11, wherein the selected one or more action recommendations comprises delaying a transmission of the request.

19. The non-transitory computer-readable storage medium of claim 11, wherein the one or more action recommendations are selected based on user characteristics of the recipient user.

20. A system, comprising: a hardware processor; and
a non-transitory computer-readable storage medium storing executable instructions that, when executed by the hardware processor, cause the hardware processor to perform steps operations comprising:
detecting that a requesting user is transmitting a request to a recipient user to perform one or more tasks with respect to a secure document;
in response to detecting that the requesting user is transmitting the request, determining a probability that the recipient user fails to complete the transmitted request by applying a machine learned model trained on features and completion data associated with historical secure documents to features of the secure document;
in response to determining the probability, identifying a plurality of action recommendations associated with the determined probability, determining a value of probability associated with each action recommendation in the plurality of action recommendations, and selecting, based on a comparison of the value of probability associated with each action recommendation to a threshold value, one or more action recommendations in the plurality of action recommendations configured to, when performed, improve a likelihood of the recipient user completing the request; and
presenting the selected one or more action recommendations to the requesting user, and displaying the value of probability associated with each of the selected one or more action recommendations exceeding the threshold value.

* * * * *